G. W. PETTIT.
Combined Grates and Ash-Sifters.

No. 147,347. Patented Feb. 10, 1874.

Witnesses:
P. C. Dietrich.
N. A. Graham.

Inventor:
G. W. Pettit.
per Munn & Co.
Attorneys.

UNITED STATES PATENT OFFICE.

GEORGE WASHINGTON PETTIT, OF FAIRMOUNT, WEST VIRGINIA.

IMPROVEMENT IN COMBINED GRATES AND ASH-SIFTERS.

Specification forming part of Letters Patent No. 147,347, dated February 10, 1874; application filed May 11, 1872.

*To all whom it may concern:*

Figure 1:
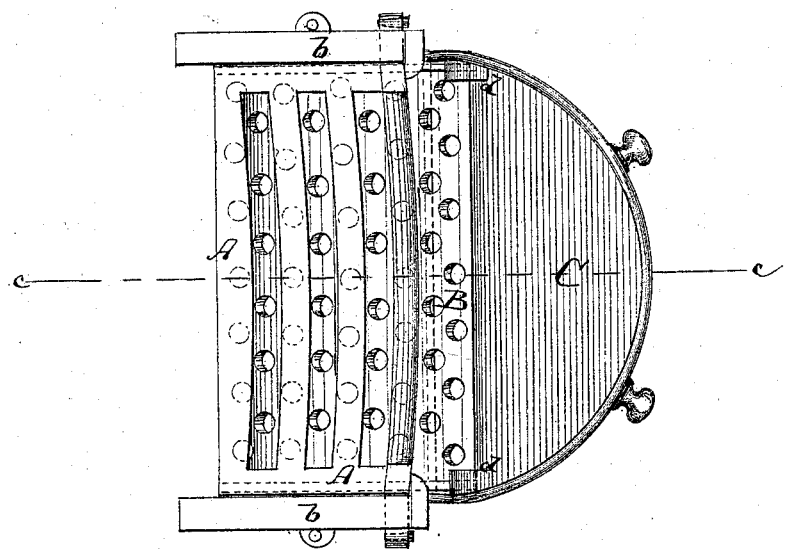
Figure 2:
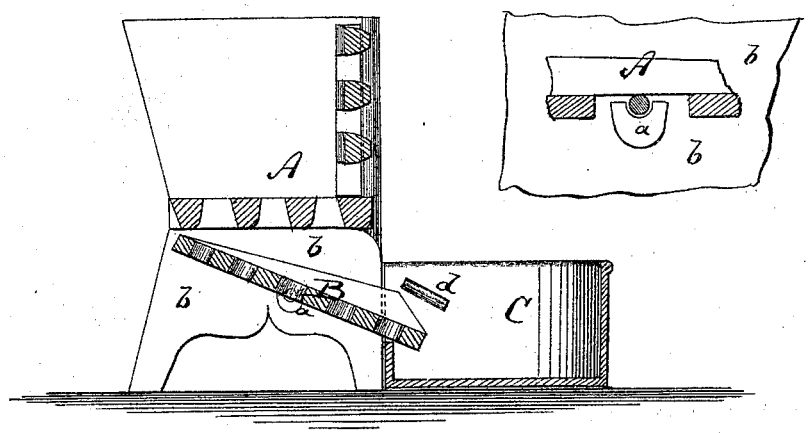
Figure 3:
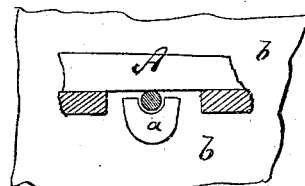

Be it known that I, GEORGE W. PETTIT, of Fairmount, in the county of Marion and State of West Virginia, have invented a new and Improved Ash-Sifter Attachment to Grates, of which the following is a specification:

Figure 1 represents a top view of my improved ash-sifter attachment to grates. Fig. 2 is a vertical transverse section of the same on the line $c\ c$, Fig. 1. Fig. 3 is a detail side view of the screen-support.

Similar letters of reference indicate corresponding parts.

My invention relates to a pivoted weighted grate or screen-plate and a coal and cinder pan, which is cut out on one side to adapt it to receive and support the front end of the same, in combination with a stationary grate, forming the bottom of a fire-pot, as herein described.

A in the drawing represents a fire-place grate of suitable style. Under it is arranged a perforated plate or screen, B, which is pivoted and supported on lugs $a$, that project from the legs or sides $b$ of the fire-place. The screen B is so pivoted, or so weighted at its front end, that it will of itself maintain an inclined position, as shown in the drawing. C is a pan, which is cut out on its inner side to adapt it to receive and support the lower end of the screen B. It is also provided with projecting lugs $d$, which will hold the screen inclined in case the weight of cinders, &c., at its rear end should at any time overbalance the front end. The pieces of coal or cinders falling from the grate A will be conducted, by the screen B, into the pan C, while the ashes fall through the perforations of said screen, thus becoming separated from the matter that may yet be used as fuel.

I do not claim the combination of an inclined screen with a stationary or other grate; but

I claim—

The combination, with the grate A, of the pivoted screen B, weighted, and projecting at its front end, and the pan C, cut out on its inner side, as and for the purpose specified.

GEORGE WASHINGTON PETTIT.

Witnesses:
    P. B. OGDEN,
    LEONARD LAMB.